United States Patent [19]
Sharma et al.

[11] Patent Number: 5,379,327
[45] Date of Patent: Jan. 3, 1995

[54] SYNCHRONOUS-TO-ASYNCHRONOUS CONVERTER

[75] Inventors: Raghu Sharma, North Oaks; Greg Johnson, Fridley, both of Minn.

[73] Assignee: Multi-Tech Systems, Inc., Mounds View, Minn.

[21] Appl. No.: 91,305

[22] Filed: Jul. 13, 1993

[51] Int. Cl.⁶ .............................................. H04L 23/00
[52] U.S. Cl. ........................................ 375/121; 375/117
[58] Field of Search ........................ 375/106, 117, 121; 370/41, 48, 24, 91, 94.1, 94.2, 84

[56] References Cited

U.S. PATENT DOCUMENTS

| | | | |
|---|---|---|---|
| 4,586,189 | 4/1986 | Tyrrell | 370/48 |
| 4,761,800 | 8/1988 | Lese et al. | 375/117 |
| 5,054,020 | 10/1991 | Meagher | 375/117 |
| 5,268,934 | 12/1993 | Sharma et al. | 375/117 |
| 5,274,679 | 12/1993 | Abe et al. | 375/117 |

Primary Examiner—Stephen Chin
Assistant Examiner—Don Vo
Attorney, Agent, or Firm—Schwegman, Lundberg & Woessner

[57] ABSTRACT

Formatted serial synchronous character data is converted to serial asynchronous data, where the synchronous bit rate varies from the asynchronous intracharacter bit rate. The character data utilizes a start bit-stop bit format which enables the converter to insert stop bits occasionally in proportion to the bit rate difference, thus compensating for bit rate mismatch. The converter offers programmable character lengths of 7, 8, or 9 bits and a possible seven different asynchronous bit rates, each selected by three programmable selection inputs. In addition, the invention uses a total digital design architecture enabling gate array integrated circuit implementation.

5 Claims, 8 Drawing Sheets

SYNCHRONOUS-TO-ASYNCHRONOUS CONVERTER

FIELD OF THE INVENTION

This invention relates generally to data communication systems, and more specifically to the interfacing and conversion of serial synchronous digital data to serial asynchronous digital data.

BACKGROUND OF THE INVENTION

Serial digital data communication is broadly divided into two classes of operation, synchronous and asynchronous. Synchronous digital data communication refers to the transfer of system clocked digital data. It occurs when the digital data being transferred must conform to specific system timing constraints and boundaries, which partition the digital data into referenced intervals of time. Any transition of the digital data must occur at these boundaries. Asynchronous digital data communication refers to the transfer of digital data which does not adhere to the specific system timing constraints and boundaries and may be clocked or unclocked digital data.

Synchronous digital data is used most commonly in communication systems and information and data processing systems. Communication systems usually employ a method for synchronizing to a known information exchange rate. Information and data processing systems utilize synchronous digital data to control the flow of information, data, and events which ensures an orderly execution of various operations and logical decisions. Synchronous protocols used in serial digital data communications produce a stream of data at a fixed clock rate, where the clock controls not only the data timing within a character, but also the character-to-character timing as well.

Asynchronous digital data is commonly used in control systems where the orderly execution of operations is controlled by a number of completion and initiation signals, often termed "handshaking". The completion signal of one set of operations will initiate the next consecutive set of operations. Asynchronous protocols used in serial digital data communications treat each character as a different message, and the characters appear in the data stream at arbitrary relative times. Within each character however, the data information (bits) is transmitted at a fixed predetermined clock rate. The protocols are actually synchronous within a character and asynchronous between characters, but they are called asynchronous, since the timing between characters is their distinguishing characteristic.

Conversion of asynchronous digital data to and from synchronous digital data is frequently performed when the synchronous intracharacter bit rate of the asynchronous digital data matches the synchronous digital data rate within tolerable limits. However, when the difference between the intracharacter bit rate of the asynchronous digital data and the synchronous digital data rate exceed tolerable limits, specialized circuits and data formats or protocols must be incorporated, such as the one presented in U.S. Pat. No. 4,048,440, entitled "Asynchronous-to-Synchronous Data Concentration System".

As described here and below, the present invention provides synchronous-to-asynchronous conversion, wide tolerance to bit rate mismatch, programmable asynchronous bit rate selection, and programmable character length selection. Also, the invention can be implemented using total digital design architecture enabling gate array integrated circuit implementation.

An example of the converse of the present invention is described in U.S. Pat. No. 5,268,934 entitled "Asynchronous to Synchronous Converter", which is assigned to the same assignee as the present invention and which is hereby incorporated by reference.

SUMMARY OF THE INVENTION

The present invention provides a synchronous-to-asynchronous converter with programmable selections for character lengths and asynchronous bit rates. The synchronous data must be formatted with character start and stop bits. A synchronous data clock and formatted synchronous data are received by the converter, where a start detector provides for synchronous start bit recognition. Once start bit recognition has occurred, the synchronous data clock pulses are used for sampling and counting the synchronous data bits. A synchronous bit counter provides for synchronous character separation control by counting each sampled synchronous data bit. Synchronous data bit latching and character storing is provided by a synchronous data sampler. Synchronous character capture is signaled to an asynchronous controller by means of a character flag. Logical switching and routing of the character length selection bits, based on character length selection, are provided by logic steering gates. A break detector provides for "break" signal recognition. Interfacing between synchronous character data and serial asynchronous data bit communication is provided by an asynchronous controller. An oscillator provides a base clock for asynchronous control timing. In addition, the oscillator clock frequency is reduced to provide the programmed asynchronous bit rate clock for the asynchronous transmitter.

BRIEF DESCRIPTION OF THE DRAWINGS

In the drawings, where like numerals refer to like components throughout the several views.

DETAILED DESCRIPTION OF THE INVENTION

In the following detailed description of the preferred embodiment, reference is made to the accompanying drawings which form a part hereof and in which is shown by way of illustration a specific embodiment in which the invention may be practiced. This embodiment is described in sufficient detail to enable those skilled in the art to practice and use the invention. It is to be understood that other embodiments may be utilized and that structural, electrical or logical changes may be made without departing from the spirit and the scope of the present invention. The following detailed description is, therefore, not to be taken in a limiting sense, and the scope of the present invention is defined only by the appended claims.

The present invention converts formatted serial synchronous character data to serial asynchronous data, where the synchronous bit rate may vary from the asynchronous intracharacter bit rate. The character data utilizes a start bit-stop bit format which enables the converter to insert stop bits occasionally in proportion to the bit rate difference, thus compensating for bit rate mismatch. The converter offers programmable character lengths of 7, 8, or 9 bits and a possible eight different asynchronous bit rates, each selected by three programmable selection inputs. In addition, the invention uses a total digital design architecture enabling gate array integrated circuit implementation.

Figure 1:
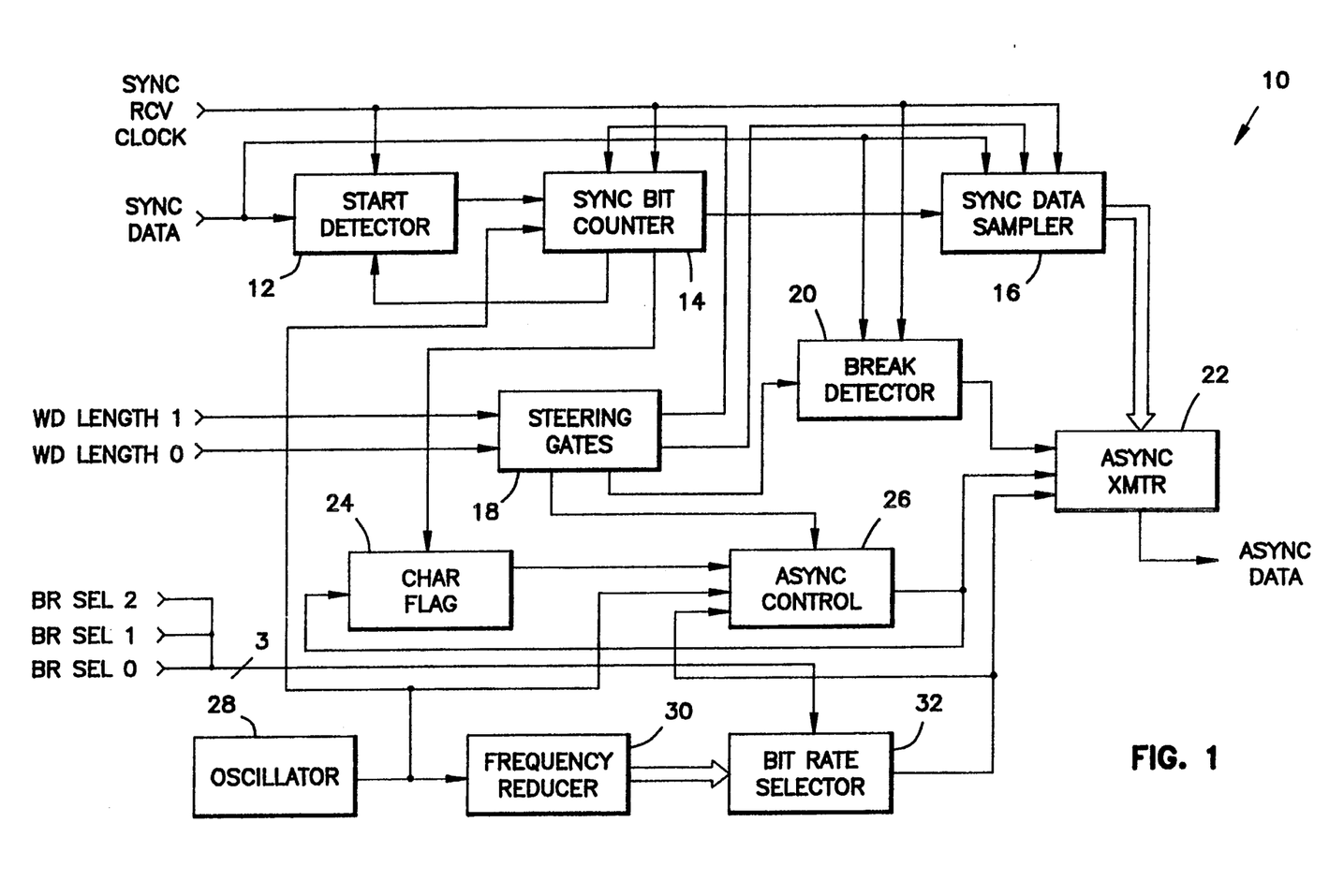
FIG. 1 is a simplified block diagram of the synchronous-to-asynchronous converter of the present invention.

The synchronous-to-asynchronous converter of the present invention as shown in simplified block diagram form in FIG. 1, displays the required input signals, functional blocks, control and data paths necessary for conversion. Generally, the converter 10 will convert the higher or lower bit rate of the serial synchronous formatted digital data stream to the lower or higher intracharacter bit rate of the serial asynchronous digital data stream respectively. The synchronous data input (SYNC DATA) must be characterized by a start bit, a predetermined number of data bits (7, 8, or 9), and there must be at least one stop bit for every two characters. See Table 1 for a description of the data character.

TABLE 1

Serial Synchronous Data Character

Bit 10 is the start bit for the data character
Bits 9, 8, or 7–1 contain the data bits
Bit 0 is the stop bit (not always used)

| S | 9 | 8 | 7 | 6 | 5 | 4 | 3 | 2 | 1 | S |
|---|---|---|---|---|---|---|---|---|---|---|
| 0 | Data Bits (variable from 7–9 bits) | | | | | | | | | |

In addition, the converter requires a synchronous receive clock (SYNC RCV CLOCK), two digital inputs identifying the predetermined number of synchronous data bits (WD LENGTH 0, WD LENGTH 1), and three digital inputs identifying the bit rate selection of the asynchronous data (BR SEL 0,1,2). Output from the converter (ASYNC DATA) will be a start bit, followed by the predetermined number of data bits, followed by a stop bit.

A "break" detector 20 is also included in the converter which monitors the input synchronous data stream, looking for a minimum number of consecutive lows (zeros or spaces) based on the predetermined number of data bits. Upon detection and coincident with the synchronous data rate clock, the asynchronous output transmission will go low (zero or space) immediately.

The synchronous-to-asynchronous converter 10, shown in FIG. 1, comprises start detector 12, synchronous bit counter circuit 14, synchronous data sampler circuit 16, steering gate circuit 18, break detector circuit 20, asynchronous transmitter circuit 22, character flag circuit 24, asynchronous control circuit 26, oscillator circuit 28, frequency reducer circuit 30, and bit rate selector circuit 32.

Oscillator 28 provides a digital, fundamental frequency signal to control the timing and sequence of events for asynchronous data generation. In addition, the digital signal from oscillator 28 is fed to frequency reducer 30, where the signal is divided and conditioned into a plurality of digital signals, each at a different asynchronous bit rate frequency, and coincident with the digital signal from oscillator 28. Frequency reducer 30 passes these signals to bit rate selector circuit 32. Based on the logic values of the BR SEL 2, BR SEL 1 and BR SEL 0 inputs (defining the selected BAUD rate), bit rate selector circuit 32 will pass the clock signal having the frequency matching the selected bit rate to asynchronous transmitter circuit 22 and asynchronous control circuit 26.

Serial synchronous data (SYNC DATA) input is fed to start detector 12 which monitors the data for a start pulse by sampling the data on each rising transition of the synchronous receive clock (SYNC RCV CLOCK). During this time, the serial synchronous data (SYNC DATA) is also routed to break detector 20 and synchronous data sampler 16.

Synchronous data sampler 16 contains a shift register and a holding register. Serial synchronous data (SYNC DATA) will be continuously shifted in to the shift register on each rising transition of the synchronous receive clock (SYNC RCV CLOCK), however, the transfer from the shift register to the holding register will not occur until start pulse recognition has occurred and a transfer signal is received from synchronous bit counter circuit 14.

Start pulse recognition occurs when a low (zero or space) has been sampled from the serial synchronous data input (SYNC DATA), thus causing start detector 12 to initialize and enable synchronous bit counter 14. Synchronous bit counter 14 contains a synchronous 4-bit counter whose initial value at this time is determined by the word length selection inputs (WD LENGTH 1, WD LENGTH 0) via steering gates 18.

Synchronous bit counter 14 will now begin to count the rising transitions of the synchronous receive clock (SYNC RCV CLOCK). After every clock count of decimal 15 (1111), synchronous bit counter 14 will provide a clock pulse to synchronous data sampler 16, which is coincident with the rising edge of the clock received from oscillator 28. Synchronous data sampler 16 will then transfer the data word (character) in the shift register to the holding register. At the time synchronous bit counter 14 sends a clock pulse to synchronous data sampler 16, synchronous bit counter 14 will also send a pulse to character flag circuit 24 indicating character capture has occurred. Character flag circuit 24 will immediately raise a flag signal to asynchronous control circuit 26, which tells asynchronous control 26 there is a character ready to be transferred to asynchronous transmitter 22.

Asynchronous control circuit 26 contains a counter for determining an asynchronous character boundary. Upon receipt of the flag signal from character flag circuit 24 and if the counter has reached a count of decimal 15 (1111), asynchronous control 26 will send a signal to asynchronous transmitter 22 telling it to load the data word (character) from synchronous data sampler 16. At the same time, asynchronous control 26 will also send a signal to character flag circuit 24 to clear the flag signal, and the counter will load the initial value and begin counting selected bit rate clock pulses. The initial value loaded in the counter is determined by the word length selection inputs (WD LENGTH 1, WD LENGTH 0) via steering gates 18.

Once asynchronous transmitter 22 has received a load signal from asynchronous control 26, asynchronous transmitter 22 will parallel load the data word (character) from synchronous data sampler 16 on the next rising edge of the selected bit rate clock. The following rising edge of the selected bit rate clock will cause the first bit of the data word (character) to appear on the asynchronous data output line (ASYNC DATA).

After every clock count of decimal 15 (1111), asynchronous control 26 looks at the flag signal from character flag circuit 24. If present, the process repeats as described. If not present, asynchronous control 26 will wait until a flag signal from character flag circuit 24 is received, then the process repeats as described previously.

Break detector 20 monitors the synchronous data input (SYNC DATA) looking for lows (zeros or spaces). Based on word length selection (WD LENGTH 1, WD LENGTH 0), detection occurs if no highs (ones or marks) are received within 17, 19, or 21 synchronous bit periods (17, 19, or 21 rising edges of SYNC RCV CLOCK). At that time, break detector 20 will force the asynchronous data output (ASYNC DATA) from asynchronous transmitter 22 to a low (zeros or spaces).

Thus, the synchronous-to-asynchronous converter of the present invention provides that by detecting the synchronous start bit, sampling each synchronous bit, counting each synchronous bit to form the synchronous character boundaries, and transferring the synchronous character to an asynchronous transmitter at the boundary time for an asynchronous character, and if the bit rate mismatch is within tolerable limits, synchronous digital data will be converted to asynchronous digital data at the selected asynchronous bit rate.

Figure 2:
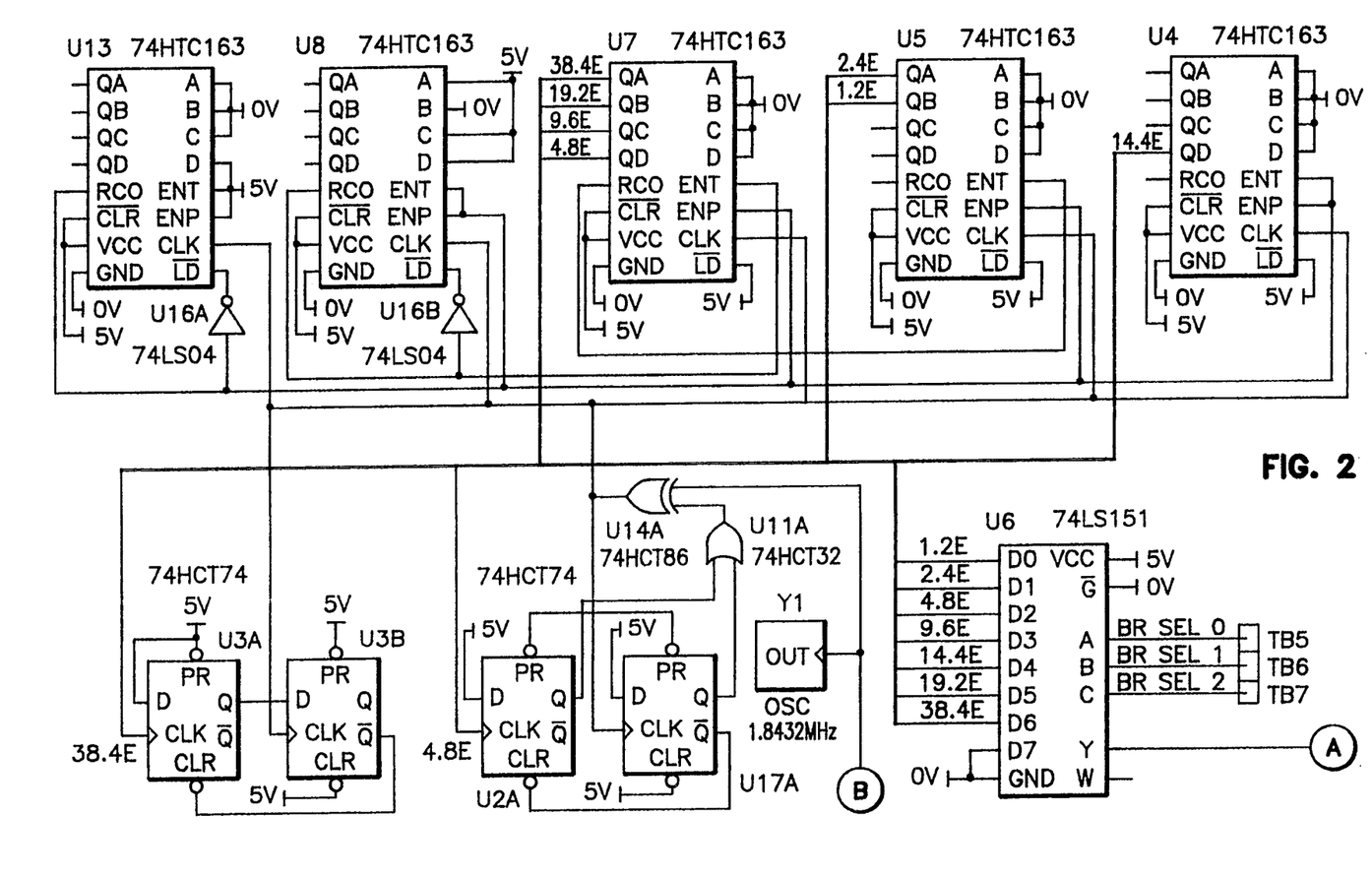
FIG. 2 is a detailed electrical schematic diagram showing the oscillator, frequency divider and bit rate selector of FIG. 1.

FIG. 2 is a detailed electrical schematic diagram of the oscillator circuit 28, the frequency reducer circuit 30, and the bit rate selector circuit 32. A 1.8432 MHz oscillator Y1 provides the base frequency for the operation of the present invention. This frequency is down counted by the counter circuits U4, U5, U7, U8, U13 and the latch circuits U3A, U3B, U2A, and U17A to produce a plurality of asynchronous communication frequencies which are feed into selector circuit U6. The inputs D0–D6 of selector circuit U6 indicate seven individual lines corresponding to a bus of seven base frequencies derived from the rest of the circuits of FIG. 2. A bus line is used to describe the routing of these signals rather than individual wires in FIG. 2. The selection frequencies correspond to baud rate frequencies for the asynchronous output of the present invention. In FIG. 2, the label 1.2e corresponds to 1200 baud, 2.4e corresponds to 2400 baud, 4.8e corresponds to 4800 baud, 9.6e corresponds to 9600 baud, 14.4e corresponds to 14,400 baud, 19.2e corresponds to 19,200 baud and 38.4e corresponds to 38,400 baud (see Table 3).

The bit rate select lines BR SEL 0-2 of FIG. 2 are the selector inputs for selector circuit U6. The output A is the selection of the baud rate frequency selected based upon the input to BR SEL 0-2 inputs.

Figure 3:
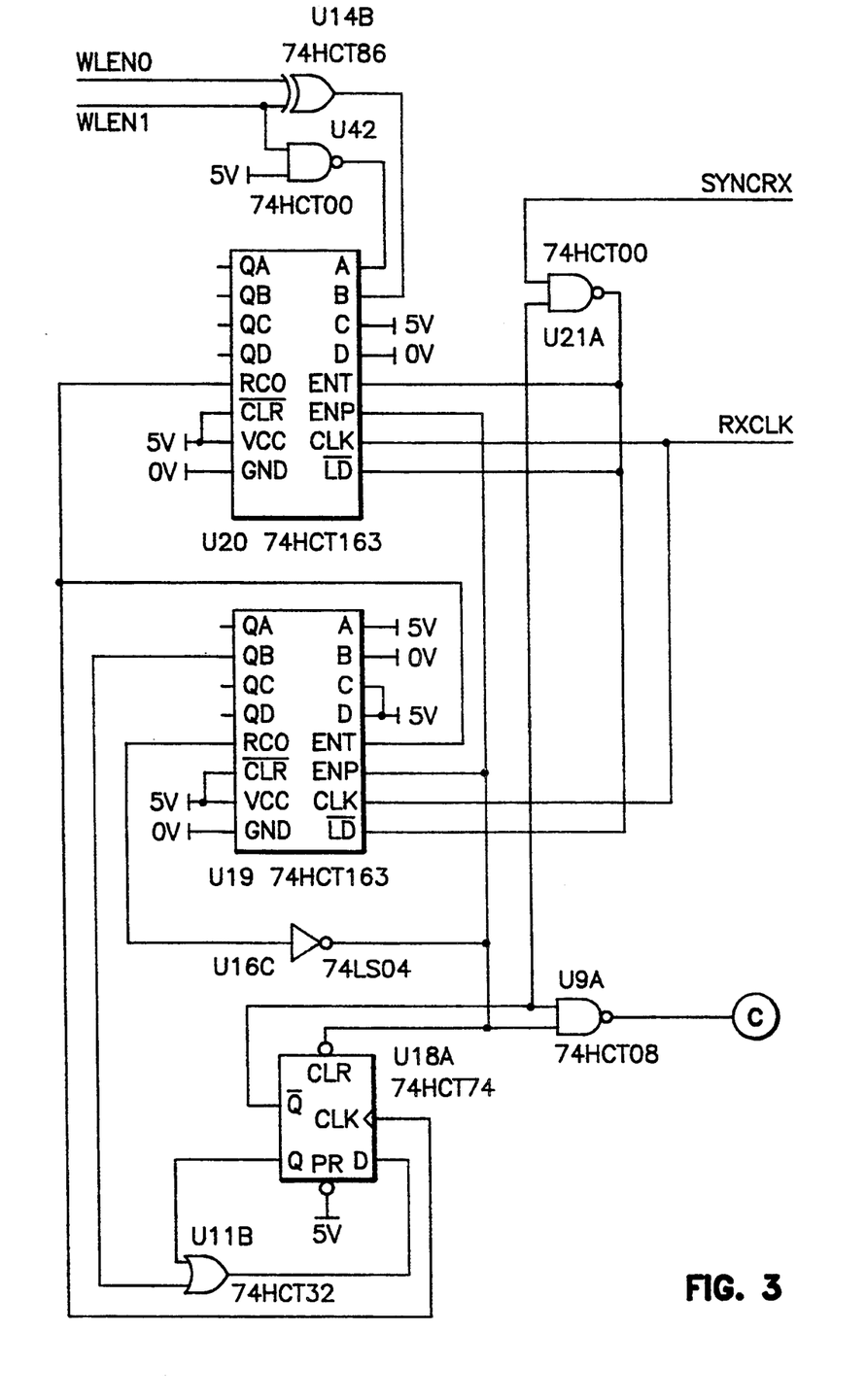
FIG. 3 is a detailed electrical schematic diagram of the break detector of FIG. 1.

FIG. 3 is a detailed electrical schematic diagram of the break detector circuit 20 of FIG. 1. The word length selection lines WLEN 0, WLEN 1 are used to preset counter circuit U20 to detect a break duration at a count of 17, 19 or 21 depending upon the word length selected by word length inputs WLEN 0-1 for the number of databits of 7, 8 or 9, respectively. Counter U19 counts after the ripple carry outputs of U20 and sets line C to a one to indicate a break detected on the SYNCRX data input.

TABLE 2

| Data Bits per Character Select Code | | |
|---|---|---|
| WD LENGTH 0 | WD LENGTH 1 | BITS PER CHARACTER |
| 0 | 0 | 7 |
| 0 | 1 | 8 |
| 1 | 0 | 9 |
| 1 | 1 | Not defined |

Also input to the break detector circuit of FIG. 3 are the synchronous data input SYNCRX (labeled as SYNC DATA in FIG. 1) and the synchronous clock RXCLK (labeled as SYNC RCV CLOCK in FIG. 1) which is used to clock the counters U20, U19 to count the consecutive zeros on the SYNCRX data line for break detection. The output of FIG. 3 indicated by label C indicates whether a break was detected.

TABLE 3

| Baud Rate Select Code | | | |
|---|---|---|---|
| BR SEL 0 | BR SEL 1 | BR SEL 2 | BAUD RATE |
| 0 | 0 | 0 | Not defined |
| 0 | 0 | 1 | 1200 |
| 0 | 1 | 0 | 2400 |
| 0 | 1 | 1 | 4800 |
| 1 | 0 | 0 | 9600 |
| 1 | 0 | 1 | 14,400 |
| 1 | 1 | 0 | 19,200 |
| 1 | 1 | 1 | 38,400 |

Figure 4:
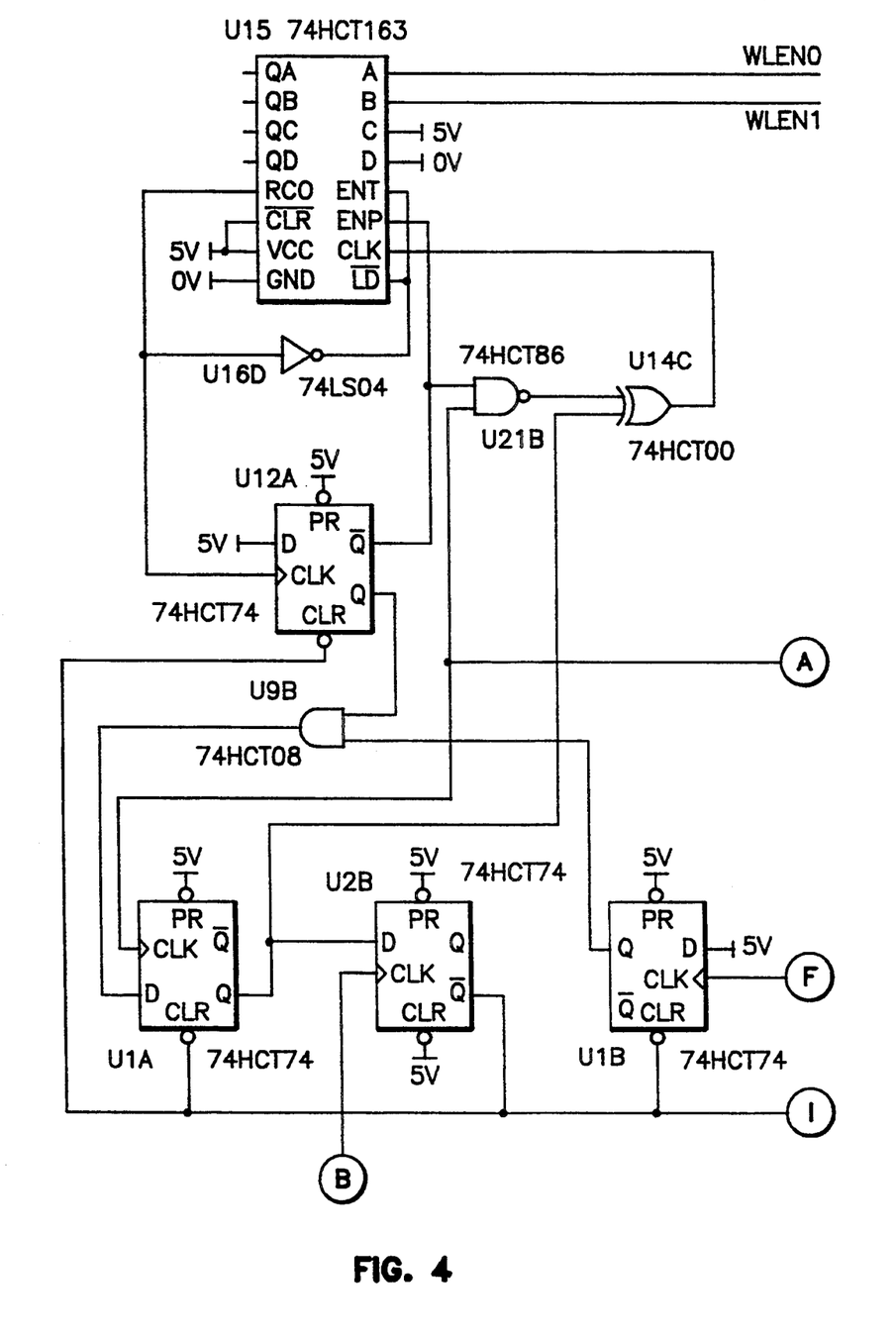
FIG. 4 is a detailed electrical schematic diagram of the synchronous bit counter of FIG. 1.

FIG. 4 is a detailed electrical schematic diagram of the char flag circuit 24 and a potion of the asynchronous control circuitry 26 of FIG. 1. This circuit counts the number of clock pulses from the selected baud rate clock on line A based on word length inputs WLEN 0, WLEN 1 as preset values into counter circuit U15. This counter is used to determine when a complete character has been detected and to generate a character flag output pulse on output I. The circuit is initialized by the start detector circuit 12 on line F and synchronized to the fundamental clock frequency from oscillator 28 on line B.

Figure 5:
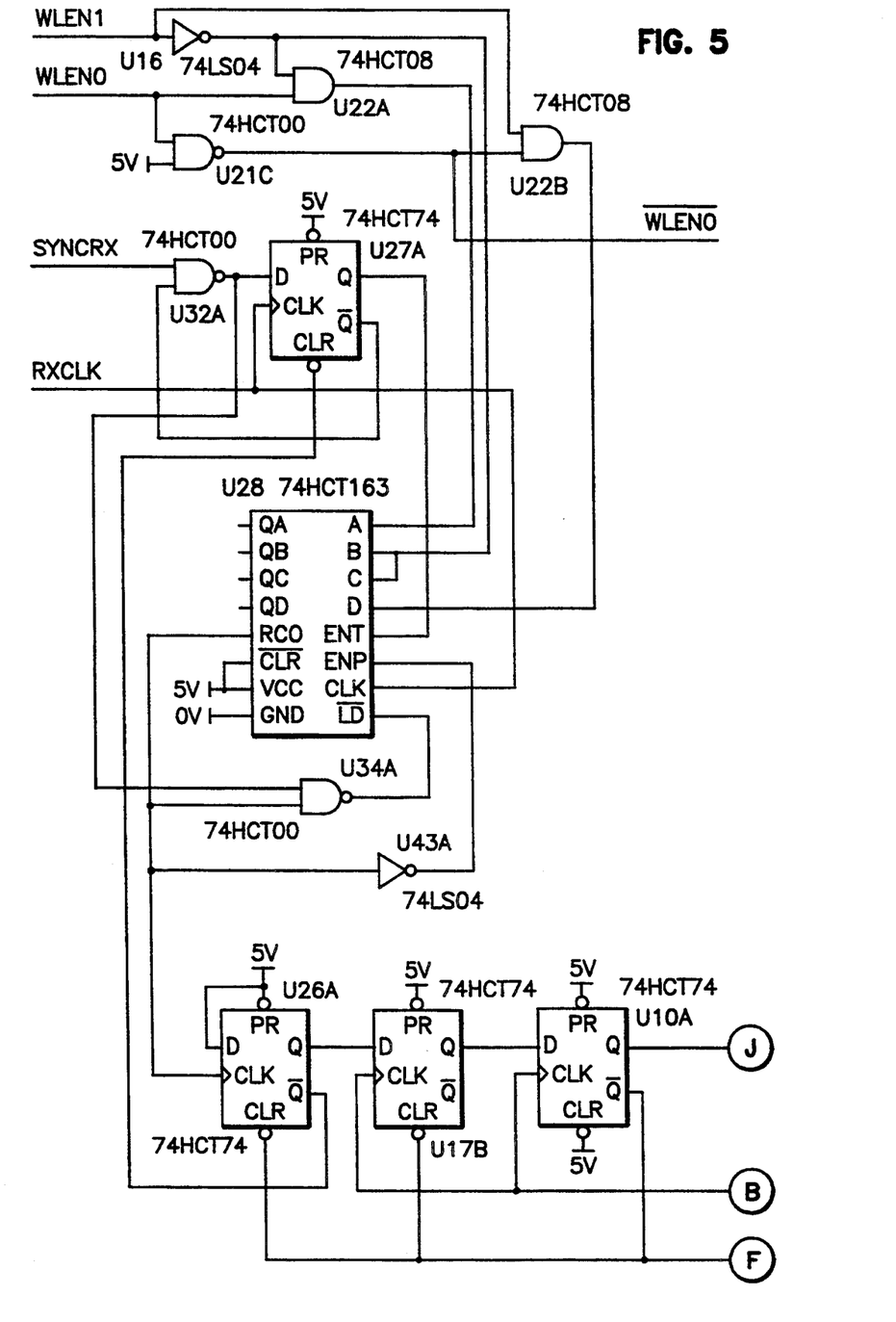
FIG. 5 is a detailed electrical schematic diagram of the start detector circuit of FIG. 1.

FIG. 5 is a detailed electrical schematic diagram substantially showing the start detector circuit 12 of FIG. 1. Word length inputs WLEN 1-0 serve as presets into counter circuit U28 to preset the counter circuit based on the number of bits per character the incoming serial data characters will contain.

Figure 6:
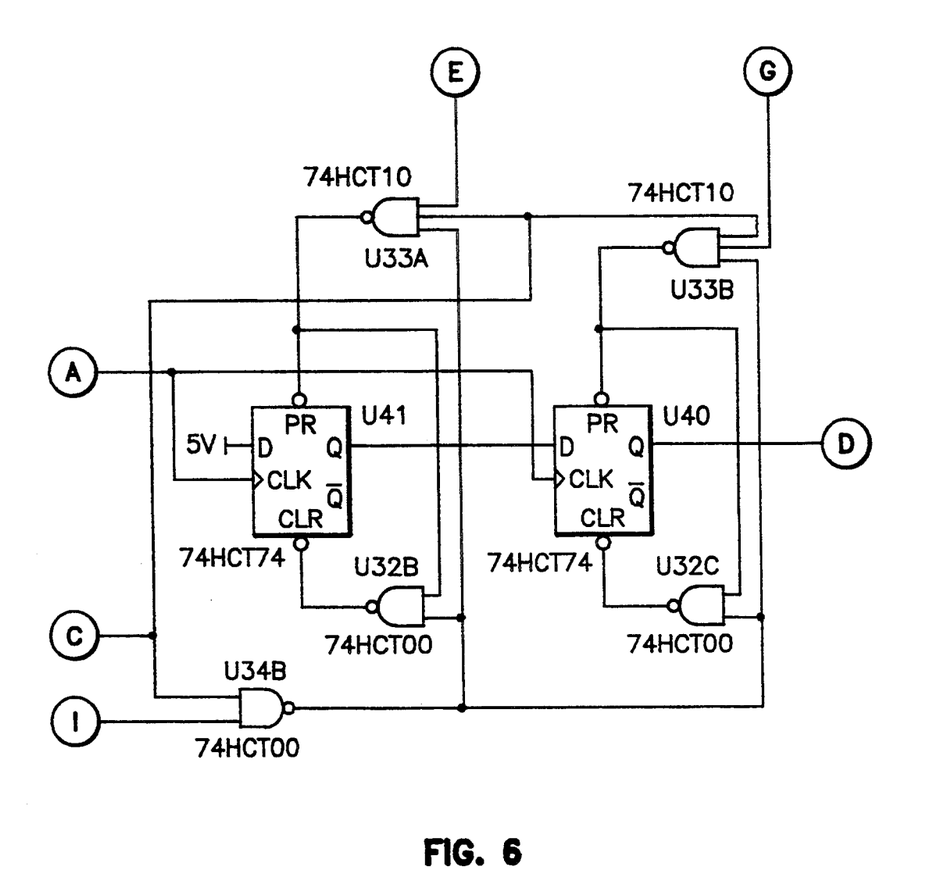
FIG. 6 is a detailed electrical schematic diagram including the portion of the control logic for the asynchronous control circuit of FIG. 1.

The incoming serial data line SYNCRX is clocked into latch circuit U27A using the serial synchronous clock RXCLK. Counter circuit U28 counts up from a preselected number determined from WLEN 0-WLEN 1 to count the number of characters in the current character in the SYNCRX synchronous serial data line to determine the location of the next start bit. The ripple carry output of U28 indicates that the counter has counted up to the location of the next start bit and sets latch circuit U26A. This in-turn sets latch circuit U17B clocked by the fundamental clock frequency 1.84312 MHz on line B which also in-turn clocks latch circuit U10A also clocked by the fundamental clock frequency. Output J indicates the detection of the start bit. Upon latch circuit U10A producing the start pulse on output J of FIG. 5, the Q overbar output of latch circuit U10A is then used to clear latches U26A and U17B for preparation for detecting the next start bit, FIG. 6 describes more of the asynchronous controlled circuit 26 of FIG. 1. Input A is the selected bit rate clock from bit rate selector 32 of FIG. 1, input C is the break detect signal from FIG. 3, input I is the character flag from FIG. 4, input E is the load strobe from FIG. 7, input G is another timing strobe from FIG. 7, and output D is the bit stuffing serial input to the parallel in-serial out circuit U24 of FIG. 8.

Figure 7:
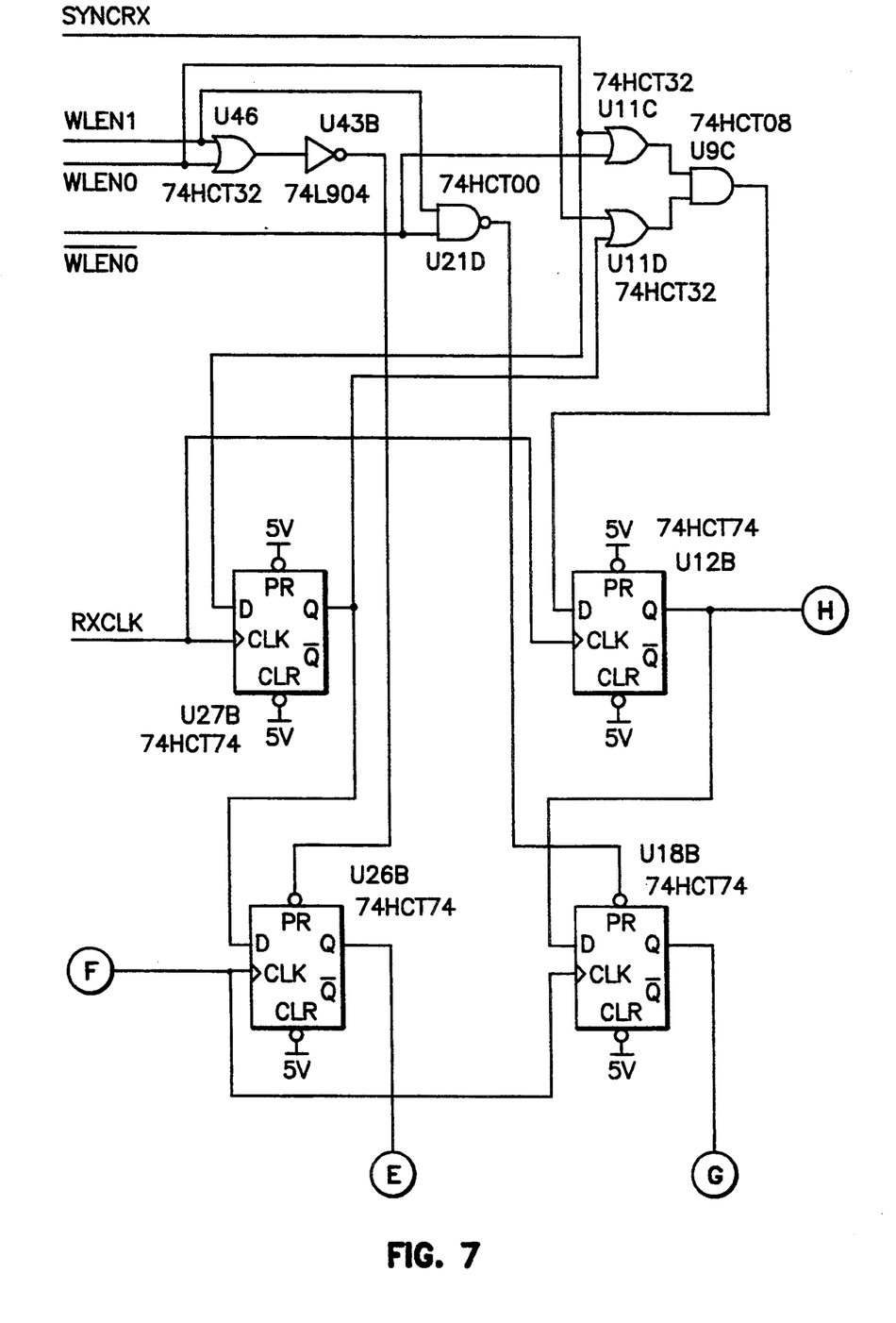
FIG. 7 is a detailed electrical schematic diagram of the steering gates and a portion of the asynchronous control circuit of FIG. 1.

FIG. 7 corresponds to more of the asynchronous control circuit 26 and the steering gates circuit 18 of FIG. 1. The word length inputs WLEN 0-1 are the word length digital inputs to the circuit. WLEN 0 overbar signal is generated from FIG. 5. Input F to this circuit corresponds to the start detect pulse from FIG. 5. Output E is a load strobe which drives a portion of the asynchronous control circuit shown in FIG. 6. Output H is used to drive the sync data sampler and asynchronous transmitter circuits of FIG. 8.

Figure 8:
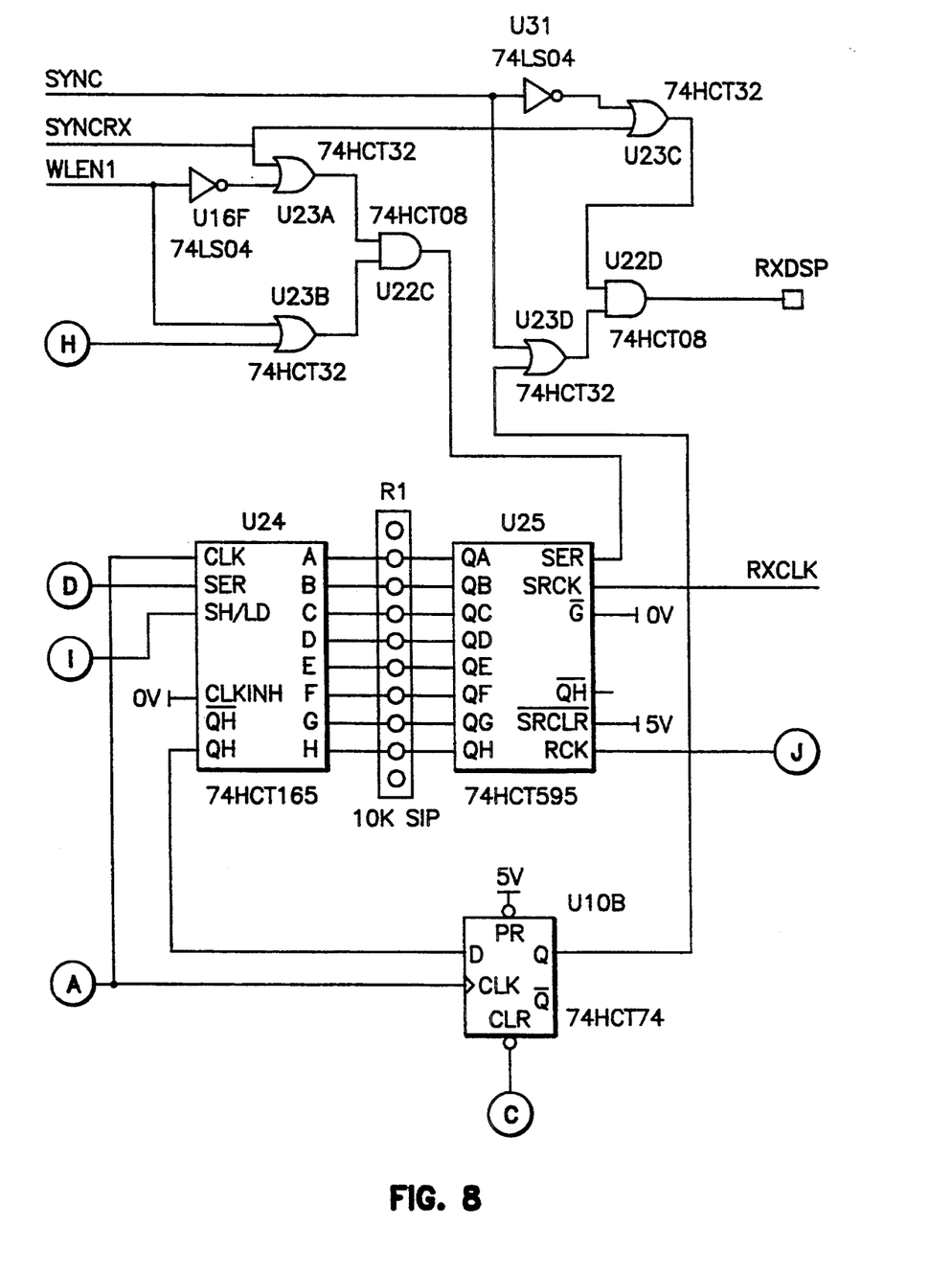
FIG. 8 is a detailed electrical schematic diagram of the synchronous data circuit and the asynchronous transmitter circuit of FIG. 1.

FIG. 8 comprises the synchronous data sample circuit 16 and the asynchronous transmitter circuit 22 of FIG. 1. A serial in-parallel out latch circuit U25 is used to receive and capture the serial synchronous data. The serial data begins being stored upon receipt of the start detect pulse on input J and is clocked using the serial synchronous clock RXCLK. Upon complete capture of a character in circuit U25, the character bits are parallel loaded into parallel load-serial out circuit U24 under command of the character flag I from FIG. 4. The character is then serially shifted out at the clocking rate on line A of the selected bit rate from FIG. 2. The character is then transmitted as an asynchronous data packet on output line RXDSP corresponding to the asynchronous data output of FIG. 1.

While the present invention has been described in connection with the preferred embodiment thereof, it will be understood that many modifications will be readily apparent to those of ordinary skill in the art and the application is intended to cover any adaptations or variations thereof. Therefore, it is manifestly intended that the invention be limited only by the claims and the equivalents thereof.

What is claimed is:

1. An apparatus for converting characters having a programmable length from synchronous to asynchronous form, comprising:

input means for receiving and passing serial synchronous data characters, wherein each of the serial synchronous data characters includes at least a start bit, a programmed number of synchronous data bits followed by at least one stop bit for every two characters;

synchronous clock input means for receiving and passing a serial synchronous clock signal associated with the serial synchronous data characters;

word length input means for inputting and passing a bit code indicating the number of synchronous data bits in each of the serial synchronous data characters;

bit rate input means for inputting and passing a rate code for selecting an asynchronous transmission rate;

clock means for providing a clock signal at the asynchronous transmission rate selected in response to the rate code;

start detector means connected for receiving the serial synchronous data characters from the input means, for receiving the serial synchronous clock signal from the synchronous clock input means, and operable for synchronous start bit recognition on each serial synchronous data character and further operable for producing a start indicator in response thereto;

synchronous bit counter means connected for receiving the serial synchronous data characters, connected to the synchronous clock input means for receiving the serial synchronous clock signal, connected to the start detector means for receiving the start indicator, connected to the clock means for receiving the clock signal, and connected to the word length input means for receiving the bit code, and operable for counting each bit of the serial synchronous data character and for producing a reset signal when all the data bits of a complete serial synchronous data character are counted;

synchronous data sampler means connected for receiving the synchronous data bits of the serial synchronous data characters, connected to the synchronous clock input means for receiving the serial synchronous clock signal, connected to the synchronous bit counter means for receiving the reset signal and connected to the word length input means for receiving the bit code, and operable for latching each bit of the synchronous data bits of the serial synchronous data character, for storing the synchronous data bits of the serial synchronous data character and for outputting the synchronous data bits;

character flag means connected to the synchronous bit counter means for providing a character ready flag when the synchronous data sampler means has stored a complete serial synchronous data character;

asynchronous control means connected to the character flag means for receiving the character ready flag and connected to the word length input means for receiving the bit code, and for providing a transfer command signal in response thereto;

asynchronous transmitter means connected to the synchronous data sampler means and connected to the asynchronous control means, for receiving the synchronous data bits upon receipt of the transfer command signal and for asynchronously transmitting the synchronous data bits thereby converting the serial synchronous data into serial asynchronous data; and break detector means connected to the asynchronous transmitter means, connected to the synchronous clock input means for receiving the synchronous data bits of the serial synchronous data characters, connected to the synchronous dock input means for receiving the serial synchronous clock signal, and connected to the word length input mean for receiving the bit code, and operable for detecting a break signal in the serial synchronous data characters and for stopping transmission of serial asynchronous data in response thereto.

2. The apparatus of claim 1, wherein the start detector means is further operable for synchronous start bit recognition when the first falling transition of the serial synchronous data is detected following the detection of the last data bit from the previous character.

3. The apparatus of claim 1, wherein the synchronous bit counter means and the break detector means each contain synchronous 4-bit counters with initial values determined by the bit code.

4. The apparatus of claim 1, wherein the start detector means contains a 4-bit counter and includes means for initializing the 4-bit counter for sampling at the approximate mid-point of the data bit portion of the serial synchronous data characters.

5. The apparatus of claim 1, wherein the synchronous data sampler means is further operable for storing the synchronous data bits in a serial-load shift register until the transfer command signal causes the synchronous data bits to be parallel transferred to a holding register in the asynchronous transmitter means.

* * * * *

UNITED STATES PATENT AND TRADEMARK OFFICE
CERTIFICATE OF CORRECTION

PATENT NO. :     5,379,327

DATED      :     January 3, 1995

INVENTOR(S) :    Raghu Sharma et al

It is certified that error appears in the above-identified patent and that said Letters Patent is hereby corrected as shown below:

Column 8, line 62, delete "dock" and insert therefor --clock--.

Column 8, line 64, delete "mean" and insert therefor --means--.

Column 10, line 1, delete "portion" and insert therefor --position--.

Signed and Sealed this

Seventeenth Day of December, 1996

Attest:

BRUCE LEHMAN

*Attesting Officer*     Commissioner of Patents and Trademarks